United States Patent [19]

Rokhvarg

[11] 4,269,145

[45] May 26, 1981

[54] ANIMAL HOUSE

[76] Inventor: Yakov Rokhvarg, 269 Ocean Pkwy., Apt. 2E, Brooklyn, N.Y. 11218

[21] Appl. No.: 963,527

[22] Filed: Nov. 24, 1978

[51] Int. Cl.³ .............................................. A01K 1/00
[52] U.S. Cl. ........................................ 119/16; 119/28
[58] Field of Search ...................... 119/15, 16, 19, 20, 119/27, 28, 14.03, 14.04

[56] References Cited

U.S. PATENT DOCUMENTS

| 2,236,851 | 4/1941 | Haselton | 119/16 |
| 2,305,259 | 12/1942 | Jeffers, Sr. | 119/16 |
| 3,116,713 | 1/1964 | Darling | 119/14.04 |
| 3,261,324 | 7/1966 | Conover | 119/14.03 |
| 3,762,370 | 10/1973 | Gulleson | 119/14.03 |
| 3,991,717 | 11/1976 | Buchanan | 119/16 |
| 4,067,297 | 1/1978 | Johnson | 119/16 |

Primary Examiner—Jay N. Eskovitz
Attorney, Agent, or Firm—Ilya Zborovsky

[57] ABSTRACT

An animal house has a stator element forming a floor and a rotor element which is rotatable relative to the stator element. The rotor element has a plurality of partitions forming a plurality of compartments, which can accommodate the animals. When the rotor element rotates and thereby the compartments move, the animals are urged to move which corresponds to the natural conditions of animals' management. The rotor elements and the stator elements may include a plurality of rotor members and stator members spaced from one another in an upright direction so as to form a multistoried animal house. The partitions may be formed by bunks for feeding the animals.

18 Claims, 5 Drawing Figures

ANIMAL HOUSE

BACKGROUND OF THE INVENTION

The present invention relates to an animal house.

Animal houses, particularly multistoried animal houses are known in the art. In such an animal house gratings are provided, forming a plurality of horizontal floors. The animal house has a central dung collecting system. The dung passes through the gaps in the gratings and is moved by scrapers into a dung collecting shaft. The feed is supplied by an elevator and then is distributed into bunks by a feeder. The above-mentioned animal house has some disadvantages. The gratings make harm and cause sickness of the animal hooves. The main disadvantages of this animal house are, however, the fact that the animals in the same are not urged to move, whereas in natural conditions they constantly move during management.

SUMMARY OF THE INVENTION

Accordingly, it is an object of the present invention to provide an animal house which avoids the disadvantages of the prior art.

More particularly, it is an object of the present invention to provide an animal house in which the animal are urged to move during the management.

In keeping with these objects, and with others which will become apparent hereinafter one feature of the present invention resides, briefly stated, in an animal house which has an immovable stator element forming a floor of the animal house, and a rotor element provided with a plurality of members forming partitions which bound a plurality of compartments, the rotor element being rotatable relative to the stator element and thereby relative the floor so that the animals are urged to move during rotation of the stator element.

In accordance with further embodiments of the present invention, the stator and rotor elements may include a plurality of stator and rotor members, respectively, spaced from one another in an upright direction, and the partitions may be formed by bunks.

The novel features of the invention are set forth in the appended claims. The invention itself will be best understood from the following description when read in connection with the drawings accompanying the latter.

BRIEF DESCRIPTION OF THE DRAWING

FIG. 4 is a view showing means for rotation a rotor element of the inventive animal house; and FIG. 5 is a fragmentary view of a dung scraper associated with one of stator elements of the inventive animal house.

DESCRIPTION OF A PREFERRED EMBODIMENT

An animal house in accordance with the present invention has a plurality of annular stator members 1 each forming a floor, and a plurality of rotor members 2 each rotatable relative to a respective one of the stator members. The stator members 1 are spaced from one another in an upright direction. The rotor members 2 are also spaced from one another in the upright direction and are coaxial with the stator members 1.

The rotor members 2 are connected with each other by a plurality of pairs of connecting elements 3 which are spaced from each other in a circumferential direction. Each stator member 1 includes a radially outer and a radially inner platform which define a gap therebetween. The connecting elements 3 extend through the gaps. Each of the platforms is formed as a cantilever floor which is secured to an outer wall and an inner wall of the animal house, respectively.

Figure 1:
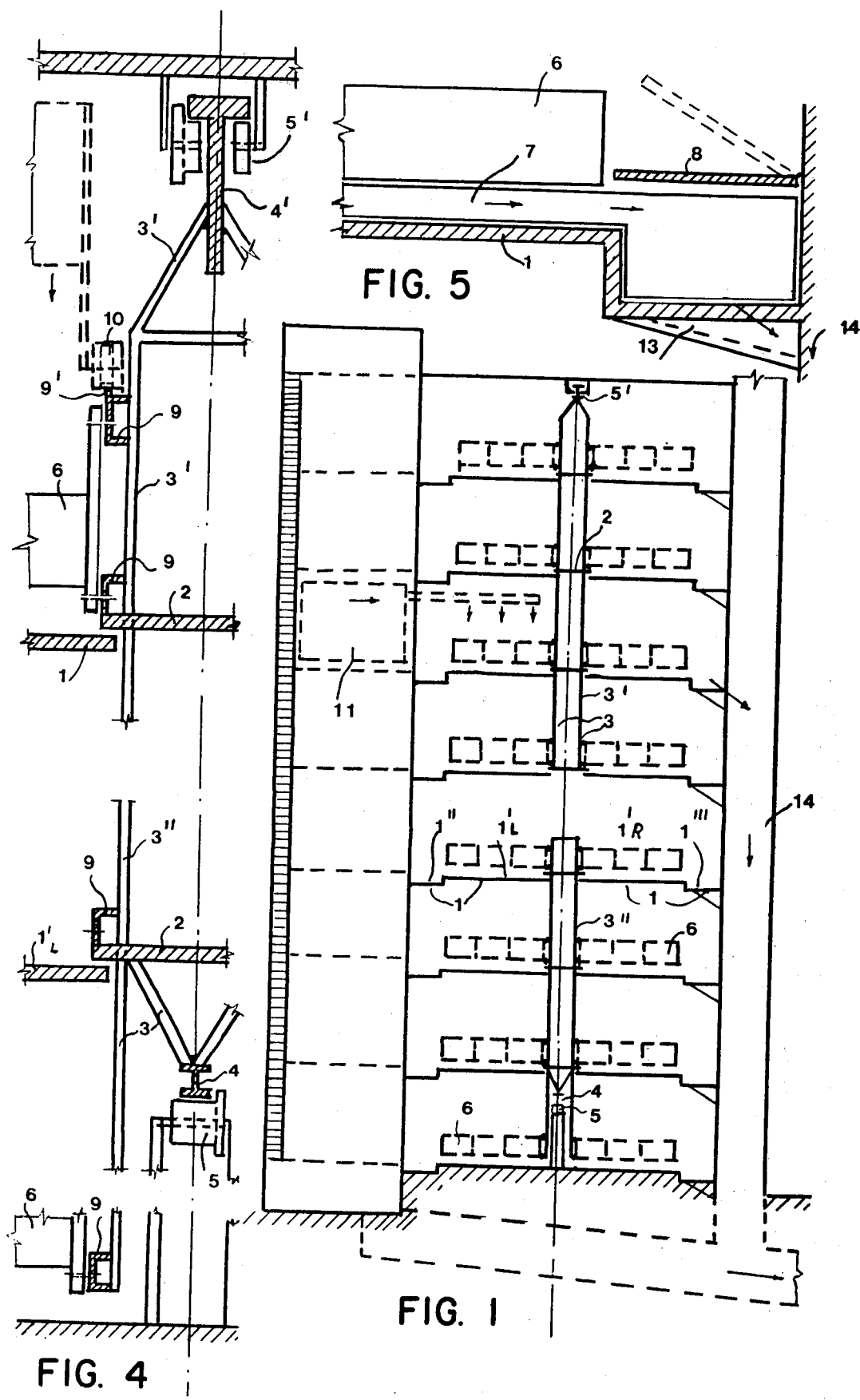
FIG. 1 is a vertical section of an animal house in accordance with the present invention, through line I—I of FIG. 2.
Figure 2:
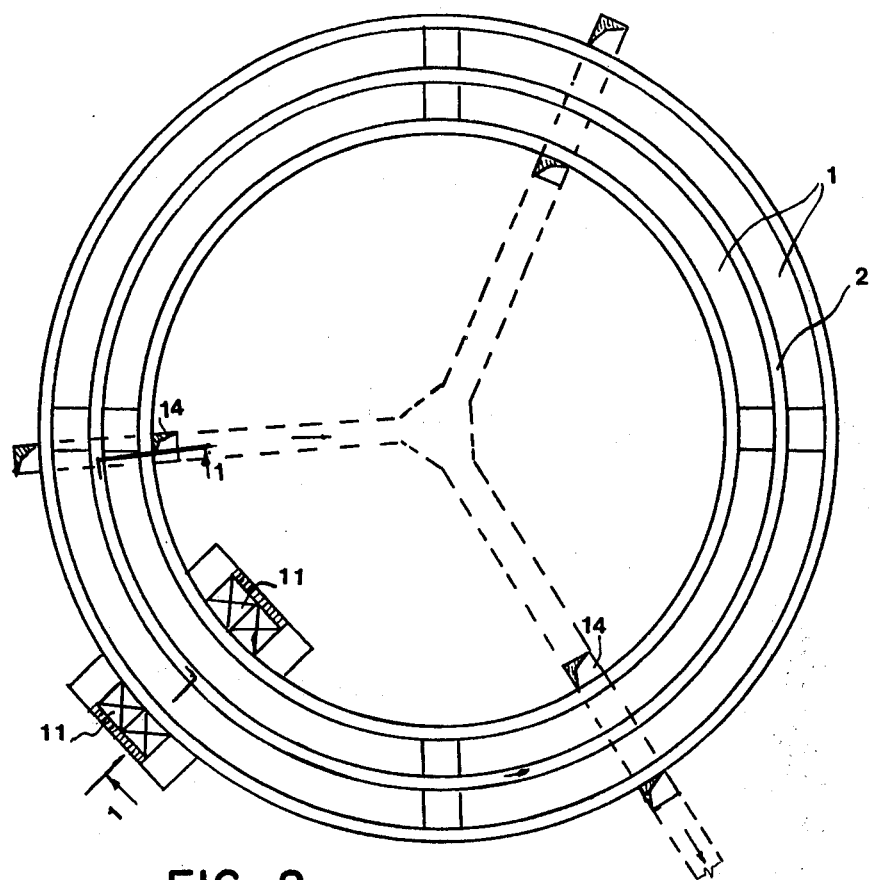
FIG. 2 is a plan view of the animal house in accordance with the invention.

The connecting elements of each pair are connected with one another at an upper end and/or at a lower end thereof. One rail or two rails 4 and 4' are provided, mounted at one of these ends or at two ends, respectively. A plurality of rotable upper rollers 5' and/or lower rollers 5 are further provided, some of them being driven in rotation by not shown drive means. The connecting elements 3 may be composed of two separate portions 3' and 3" as shown in FIG. 1. However, they may be integral in which case only the upper rail or the lower rail must be utilized. The upper rail is suspended from the upper rollers whereas the lower rail supports on the lower rollers. The rails 4 and 4' are annular. When the upper rollers and/or the lower rollers rotate, the upper and/or the lower rail also rotate under the action of friction, whereby the rotor members 2 rotate relative the stator members 1.

Each stator member 1 has central inner and outer annular portions 1' and 1'R on which the animals stand, and annular radially inner and radially outer portions 1''' and 1'', respectively, the two latter portions forming dung chutes. A plurality of groups of bunks 6 are further provided, each group being mounted on a respective one of the rotor members 2 radially inwardly and radially outwardly thereof, and also symmetrically relative to an annular center line of the rotor members 2. The bunks 6 are located above the central portions 1' and 1'R of the stator members 1 at a distance therefrom so that a gap is formed between each group of the bunks 6 and a respective one of the stator members 1.

Scrapers for cleaning dung are further provided. The scrapers are identified by reference numeral 7 and are accommodated in the above-mentioned gaps. The scrapers 7 are secured to the rotor members 2 and to the bunks 6. The bunks 6 extend in a direction which is normal to the annular center line of the rotors 2. The scrapers, however, are inclined to the center line at a leading angle which is greater than 90°. The dung chutes formed by the portions 1'' and 1''' of the stator members 1 are closed by turnable plates 8 so as to form side floors for maintenance purposes. On each level an upper and a lower annular bar 9 is provided. The upper annular bar is connected with the connecting elements 3 whereas the lower annular bar is additionally connected to a respective one of the rotor members 2.

The bunks 6 are mounted on the bars 9 at a distance from each other as considered in the circumferential direction. Each bar 9 has a plurality of holes spaced from each other in the circumferential direction so that the bunks can be mounted by known mounted means at differing distances from each other in this direction. A portal carrying an auxiliary equipment such as an additional feeding device, repairing device or the like may be provided with wheels 10 so as to move in the circumferential direction on a projection 9' formed on the upper annular bar 9.

Figure 3:
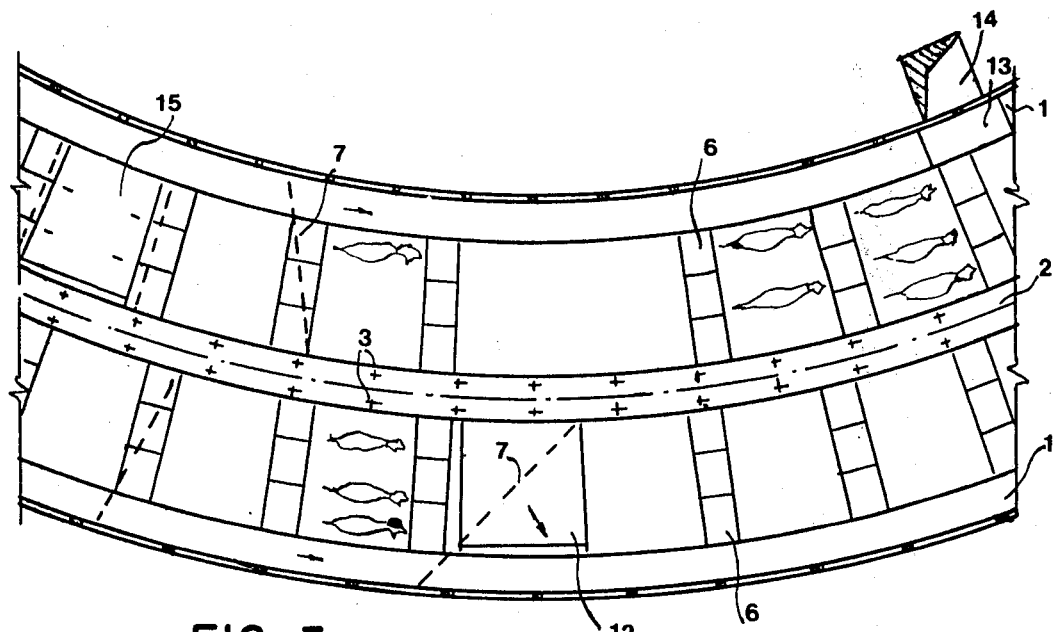
FIG. 3 is a fragment of the view shown in FIG. 2 in enlarged scale.

The animal house has a main feeder 11. It may be formed as an elevator cabin provided with an expandable and retractable arm or hose through which the feed is supplied to the bunks 6. As can be seen in FIG. 3, the bunks 6 are spaced from each other in the circumferential direction so that a plurality of compartments are formed therebetween. Animals are accommodated in the thus-formed compartments.

A machine 12 for washing and drying upper surfaces of the stator members 1 or floors of each level is provided. Each of the machines 12 is located in one of the compartments and fixedly connected with a respective one of the rotor members 2 for joint rotation therewith. On the other hand, only one machine may be provided, the machine being displaceable in the upright direction from one floor to the other. Inclined sections 13 communicate the dung chutes 1" and 1'" with vertical dung shafts 14.

The inventive animal house operates in the following manner:

The rotor members 2 are driven in rotation by the rotating means so that they move relative to the stator members 1. The animals located on the portions 1'L and 1'R of the stators in the compartments between the bunks 6 are urged to move under the action of means by which they may be tied to the bunks, or under the pushing action of the bunks which tend to push the animal from the rear side. After a certain period of management the animals can move in response to a signal indicating the beginning of the rotation since they become accustomed to the rotary movement. The scrapers 7 rotate together with the rotor members 2. They clean the upper surface of the portions 1'L and 1'R of the stator members 1 and displace the dung in the circumferential direction on the dung chutes 1" and 1'" until the dung reaches the sections 13 wherefrom it drops into the dung shafts 14. The machines 12 also rotate together with the rotor members 2 and clean and dries the floors or upper surfaces of the portions 1'L and 1'R of the stator members 1.

The portal having wheels 10 is utilized in the cases when the rotor members 2 do not rotate relative to the stator members 1 in the event of repair or malfunction.

The animals normally move in the compartments when the rotor members 2 rotate. Before the termination of the rotary movement the feed is supplied into the bunks 6. Then, the rotary movement terminates, and the animals take the feed.

When at least one of the animals is unable to move for a short time, it can be placed onto an additional platform 15 which is fixedly connected with the respective rotor member 2 and jointly rotates with the same. Thus the animal does not have to go but is passively transported by the platform 15. The latter may have wheels so as to run on the stator members 1.

It will be understood that each of the above described elements may also find a useful application in other types of constructions. Various modifications may be made without departing from the spirit of the present invention. Others by applying current knowledge can adapt it for various applications.

What is claimed and desired to be protected by Letters Patent is set forth in the appended claims:

1. An animal housing comprising
a floor part having an axis and including stationary radially inner and radially outer annular elements which are radially spaced from one another so as to form a gap therebetween, and a rotary radially intermediate annular element located between said stationary elements in said gap, said annular elements being concentric relative to one another and said stationary annular elements being arranged to support animals;
a plurality of substantially radial partitions connected with said rotary element and bounding together with the said stationary elements a plurality of compartments for accommodating the animals, said partitions together with said rotary element being rotatable relative to said stationary elements so that the animals accommodated in said compartments are urged to move, each of said stationary elements including a plurality of immovable stator members which are spaced from one another in an upright direction, said rotary element including a plurality of rotor members also spaced from one another in the upright direction and each having such partitions bounding such plurality of compartments, said rotor members together with said stator members forming a plurality of such floors, said rotor members being connected with each other and jointly movable relative to said stator members so that each of said rotor members is movable relative to respective stator members, and said rotor members together form a multi-storey spatial structure; and
means for driving said rotary element in rotation together with said partitions about said axis.

2. An animal house as defined in claim 1, wherein each of said stator members of said radially outer element has a radial outermost portion and each of said stator members of said stationary radially inner element has a radial innermost portion formed as a dropping tray.

3. An animal house as defined in claim 2, wherein at least some of said partitions bounding said compartments are formed by bunks.

4. An animal house as defined in claim 2; and further comprising a plurality of upright connecting elements spaced from one another in a circumferential direction and connecting said rotor members with each other, said driving means including means for rotating said connecting elements and thereby said rotor members about said axis.

5. An animal house as defined in claim 4, wherein each of said connecting elements has two vertically spaced ends, said rotating means including an annular rail connecting said connecting elements with each other at at least one of said ends, a plurality of stationary rollers rotatable about their axes, spaced from each other in the circumferential direction and contacting with said rail, and means for driving at least some of said rollers in rotation so as to rotate said rollers whereby said rail together with said connecting elements and said rotor members rotate about said axis.

6. An animal house as defined in claim 5, wherein said one end of said connecting elements is an upper end, said rail being mounted at said upper end and suspended from said rollers.

7. An animal house as defined in claim 5, wherein said one end of said connecting elements is a lower end, said rail being mounted at said lower end and supported on said rollers.

8. An animal house as defined in claim 5, wherein each of said connecting elements is composed of an upper connecting member and a lower connecting member which are separate members, said rotor members including a first group of upper rotor members and a second group of lower rotor members, said first group being connected by said upper connecting members whereas said second group is connected by said lower connecting members, said rotating means being arranged to rotate said upper connecting members; and further comprising further such rotating means arranged to rotate said lower connecting members, the rails of the first-mentioned rotating means being suspended from the rollers of the same whereas the rail of the further rotating means is supported on the rollers of the latter.

9. An animal house as defined in claim 5, wherein said connecting elements extend through said gap between said stationary elements.

10. An animal house as defined in claim 9, wherein the bunks of each rotor member has a first group of bunks located radially outwardly and extending in a radially outward direction from the rotor member, and a second group of bunks located radially inwardly and extending in a radially inward direction from the same rotor member.

11. An animal house as defined in claim 5, wherein each of said connecting element includes a radially inner connecting bar and a radially outer connecting bar, said bars being connected with one another at at least said one end, said rails being mounted on the thus-connected bars at said one end.

12. An animal house as defined in claim 10, wherein each of said rotor members has an annular center line, the bunks of each of said rotor members being normal to said center line.

13. An animal house as defined in claim 10, wherein the bunks of each of said rotor members is upwardly spaced from a respective one of said stator members so that a gap is formed therebetween.

14. An animal house as defined in claim 13; and further comprising a plurality of scrapers each connected with a respective one of said rotor members for joint rotation therewith and located in said gap at a leading angle to said center line exceeding 90°.

15. An animal house as defined in claim 9, wherein each of said stationary elements is a solid member.

16. An animal house as defined in claim 3; and further comprising at least one feeder which is movable in an upright direction to levels corresponding to said rotor members and said bunks, and means for transporting the feed from said feeder into the bunks, and further comprising means for controlling transporting of the feed when said transporting means is located in the region of respective bunks.

17. An animal house as defined in claim 1; and further comprising a plurality of machines for washing and drying the floors each located in one compartment of a respective one of said rotor members and connected with the latter for joint rotation so as to wash and dry the respective stator member during rotation of the respective rotor member.

18. An animal house as defined in claim 1; and further comprising at least one platform immovably connected with each of said rotor members and located in at least one of the compartments of the same so that an animal which is placed on said platform does not have to move by itself but is passively transported by said platform which rotates together with the respective rotor member.

* * * * *